(12) United States Patent
Barbot

(10) Patent No.: US 10,414,294 B2
(45) Date of Patent: Sep. 17, 2019

(54) SEAT FOR MOTOR VEHICLE

(71) Applicant: GM GLOBAL TECHNOLOGY OPERATIONS LLC, Detroit, MI (US)

(72) Inventor: Augustin Barbot, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 140 days.

(21) Appl. No.: 15/697,125

(22) Filed: Sep. 6, 2017

(65) Prior Publication Data

US 2018/0072193 A1    Mar. 15, 2018

(30) Foreign Application Priority Data

Sep. 12, 2016  (DE) ......................... 10 2016 011 048

(51) Int. Cl.
| | |
|---|---|
| *B60N 2/20* | (2006.01) |
| *B60N 2/225* | (2006.01) |
| *B60N 2/90* | (2018.01) |
| *B60N 2/02* | (2006.01) |

(52) U.S. Cl.
CPC ............. *B60N 2/203* (2013.01); *B60N 2/225* (2013.01); *B60N 2/933* (2018.02); *B60N 2002/0204* (2013.01)

(58) Field of Classification Search
CPC ...... B60N 2/225; B60N 2/2222; B60N 2/933; B60N 2002/0204; B60N 2002/022
USPC ............................................ 297/72, 94, 101
See application file for complete search history.

(56) References Cited

U.S. PATENT DOCUMENTS

| | | | |
|---|---|---|---|
| 4,655,503 A | * | 4/1987 | Kamijo ................. B60N 2/203 297/103 |
| 4,779,917 A | | 10/1988 | Campbell et al. |
| 5,076,640 A | | 12/1991 | Bulte |
| 6,199,945 B1 | | 3/2001 | Kim |
| 6,715,825 B2 | | 4/2004 | Tame |
| 7,281,761 B2 | | 10/2007 | Brown et al. |

(Continued)

FOREIGN PATENT DOCUMENTS

| | | |
|---|---|---|
| DE | 1020120011505 A1 | 12/2013 |
| FR | 2671530 A1 | 7/1992 |
| FR | 2686297 A1 | 7/1993 |

OTHER PUBLICATIONS

Vetus Ferry Helm Seat—Adjustable Backrest—Dark Blue—White Seams, https://www.vetus-shop.com/vetus-ferry-helm-seat-adjustable-backrest-dark-blue-white-seams-p-3527.html. Publicly available by at least Apr. 5, 2016.

(Continued)

*Primary Examiner* — Mark R Wendell
(74) *Attorney, Agent, or Firm* — Lorenz & Kopf, LLP

(57) ABSTRACT

A seat for a motor vehicle includes a backrest part with a front side and rear side facing away from the front side. A backrest surface, which serves for supporting a back, is transversely divided into a central section and two lateral sections. A seat part includes a sliding mount for the backrest part to realize a translational motion of the backrest part relative to the seat part between a forward facing position and a rearward facing position. Two lateral sections form a lateral support for a person on the seat and/or the seat part as a two-piece seat part including a first section and a second section and an intermediate space. A bracket extends through the intermediate space.

17 Claims, 8 Drawing Sheets

(56) References Cited

U.S. PATENT DOCUMENTS

| | | | |
|---|---|---|---|
| 7,484,795 B2* | 2/2009 | Saint-Jalmes | A47O 7/48 |
| | | | 297/130 |
| 7,644,982 B2 | 1/2010 | Paluch | |
| 9,045,062 B2 | 6/2015 | Deimen et al. | |
| 9,315,238 B2* | 4/2016 | Neese | A47C 7/40 |
| 2007/0200412 A1 | 8/2007 | Abraham | |

OTHER PUBLICATIONS

Boat Leaning Post & Swing Back Boat Seats, https://www.arrigonidesign.com/leaningpost/. Publicly available by at least Apr. 5, 2016.

* cited by examiner

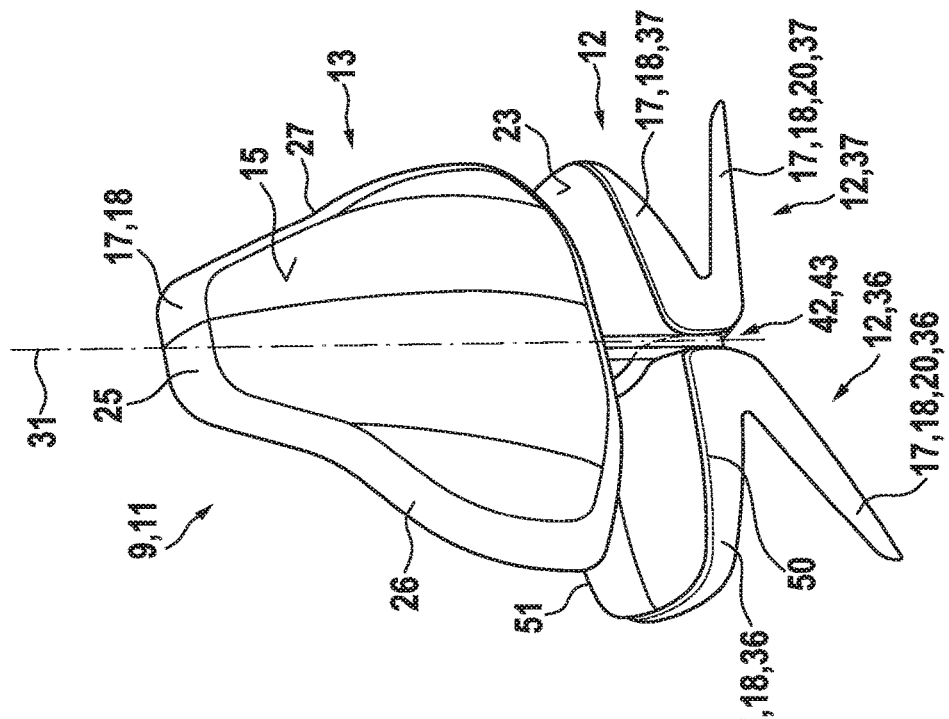
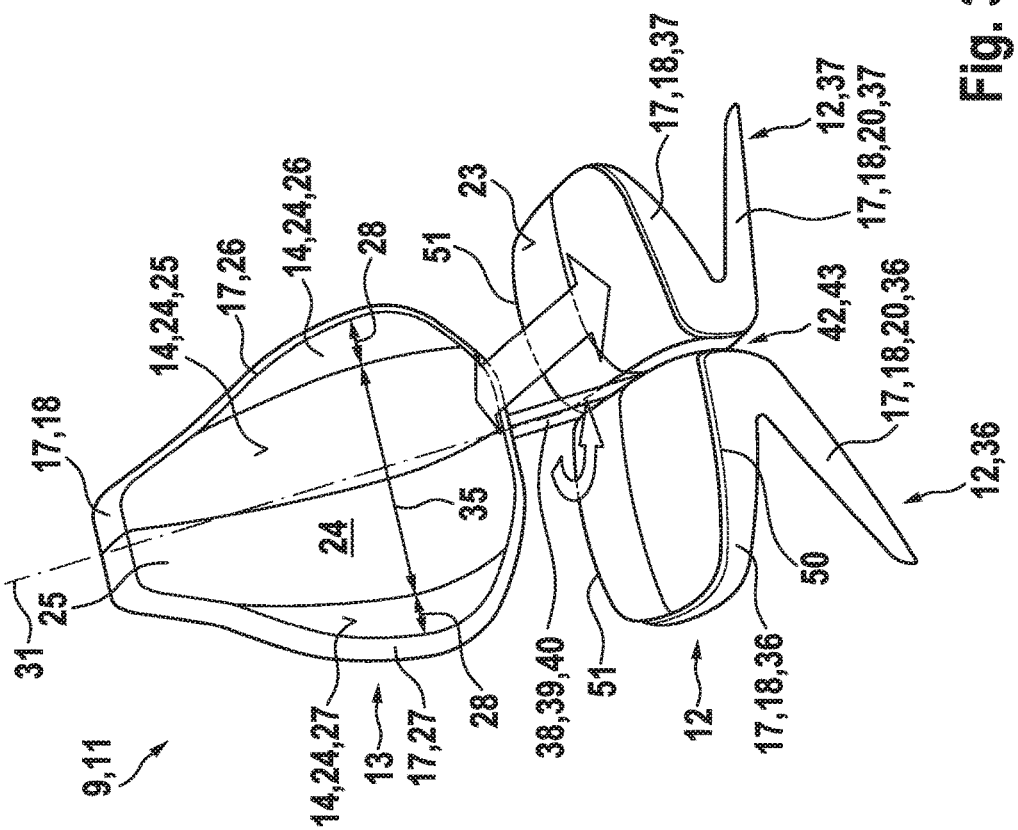

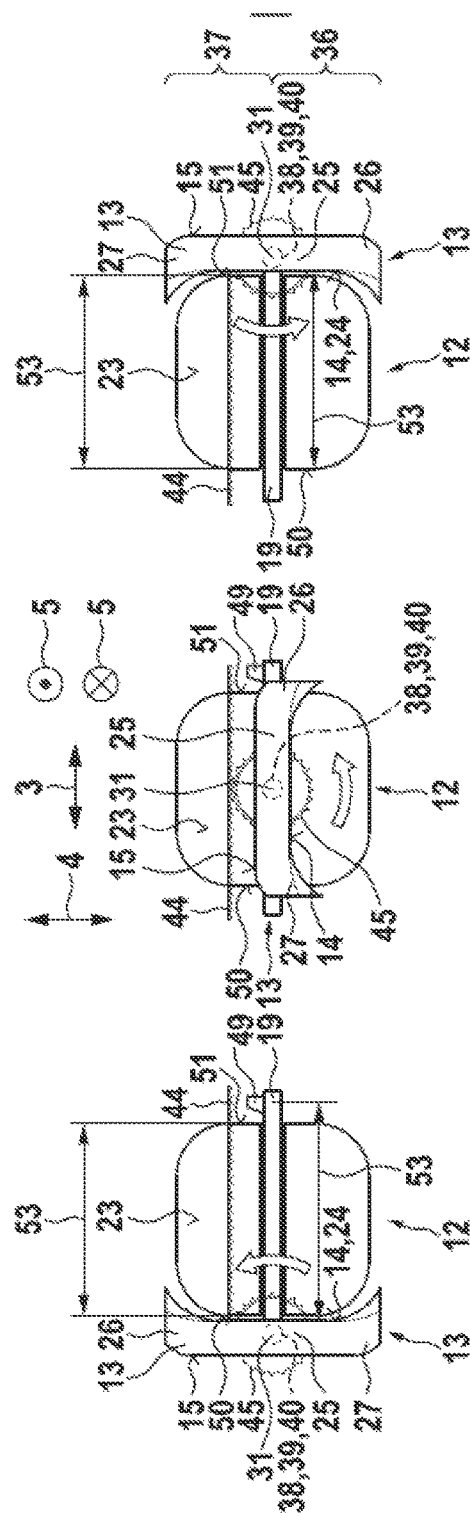

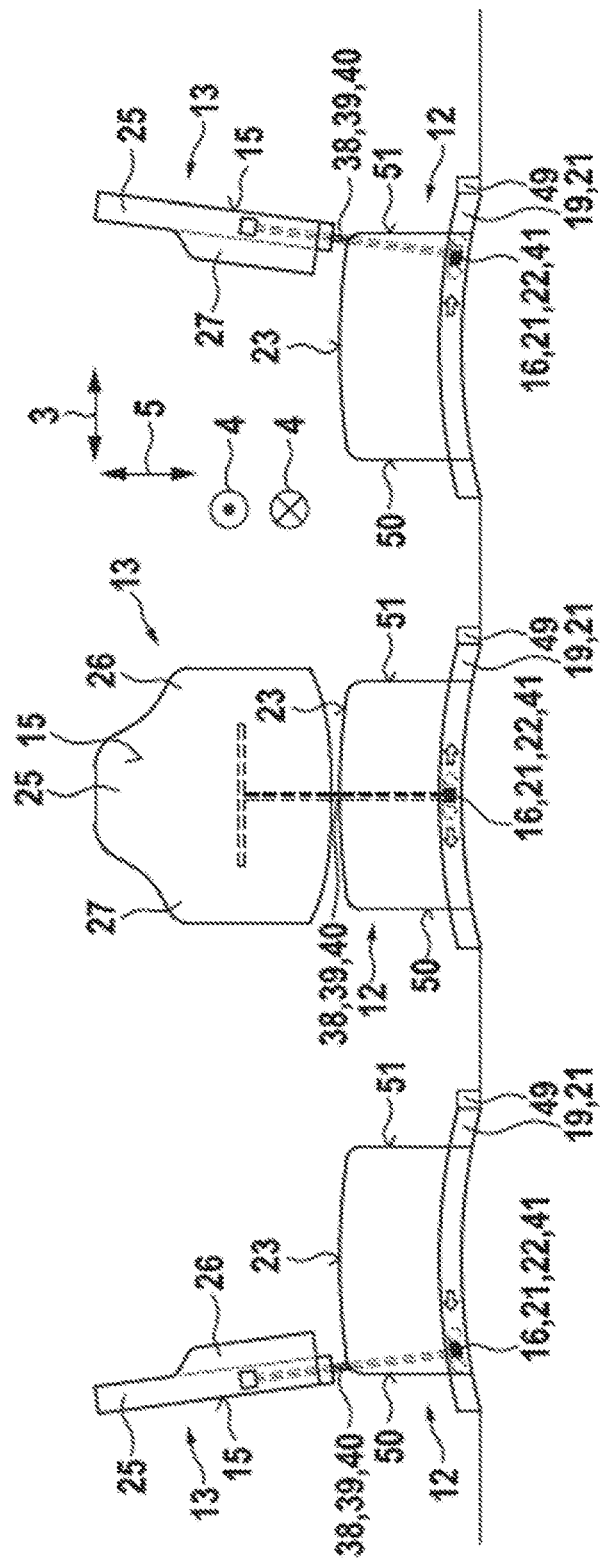

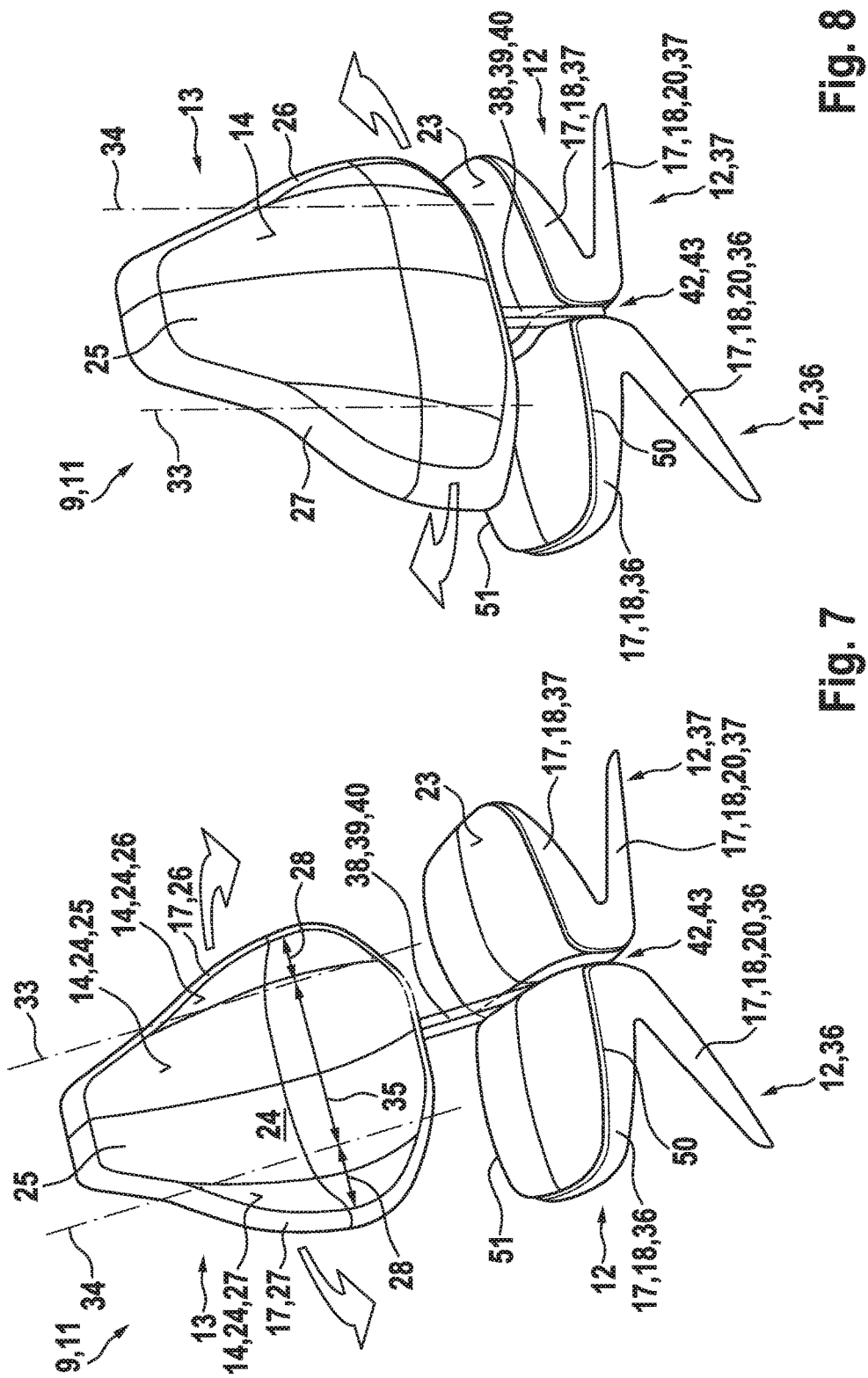

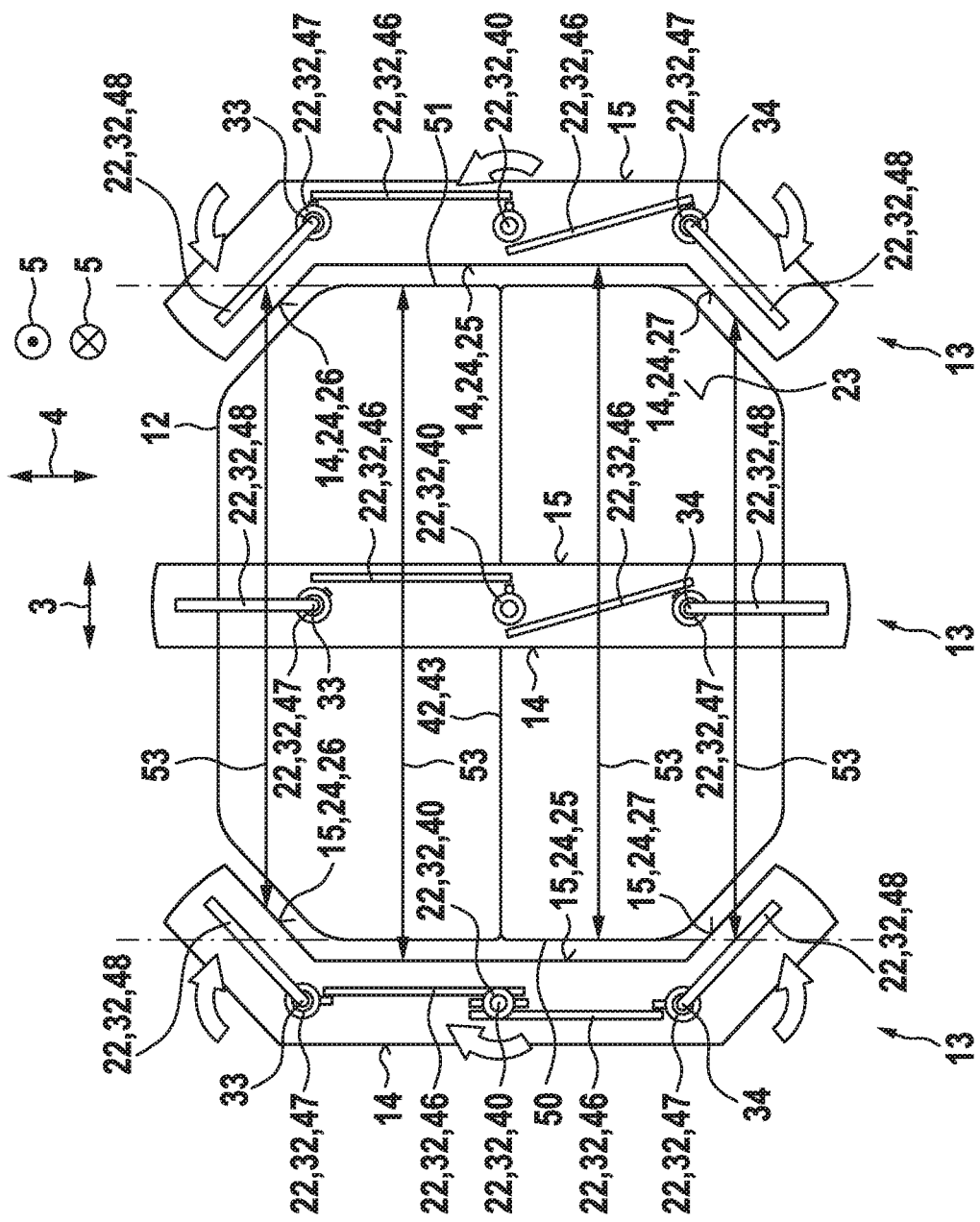

SEAT FOR MOTOR VEHICLE

CROSS-REFERENCE TO RELATED APPLICATION

This application claims priority to German Patent Application No. 102016011048.1, filed Sep. 12, 2016, which is incorporated herein by reference in its entirety.

TECHNICAL FIELD

The present disclosure pertains to a seat in a motor vehicle.

BACKGROUND

A motor vehicle includes an interior having seats are arranged within the interior. In this case, front seats include a seat part and a backrest part. Rear seats are arranged behind the front seats within the interior of the motor vehicle. The rear seats are typically combined into a rear bench seat including three seats. The seat part of the seats defines a seating surface and the backrest part of the seat defines a backrest surface. The seating surface serves for supporting a buttocks and the backrest surface serves for supporting the back of a person on the seat. The backrest part is arranged on the seat part in the region of a rear edge thereof such that a person can sit down on the seat facing forward. For certain applications in the motor vehicle, it may be advantageous or necessary that a person can also sit down on the seat facing in the opposite direction. For this purpose, the backrest part is moveably mounted relative to the seat part by a sliding mount such that the backrest part can be moved from a region on the rear edge of the seat part into a region on the front edge of the seat part in the form of a translational motion, as well as locked in the corresponding position. In this way, a person can also sit down on the seat in the opposite direction such that the face of the person is not directed forward, but rather toward the rear of the motor vehicle.

DE 10 2012 011 505 A1 describes a seat device for a motor vehicle seat including a seat structure and a backrest structure that is movably arranged relative to the seat structure by a guide mechanism. The backrest structure is coupled to the guide mechanism by a bracket such that the backrest structure is hinged and displaceable relative to the seat structure.

SUMMARY

The present disclosure provides a seat for a motor vehicle, in which the seat can be used in two opposite directions, i.e. facing forward and facing rearward, by easily converting the backrest part between two translational positions and the seat provides sufficient lateral support for persons in the two translational positions.

The seat includes a backrest part with a front side and an opposite rear side, as well as with a backrest surface that serves for supporting a back. The backrest part is transversely divided into a central section and two lateral sections. The seat also includes a seating surface for supporting a buttocks and a sliding mount for the backrest part providing a translational motion of the backrest part relative to the seat part such that the backrest part is arranged in the region of the rear edge of the seat part in a first translational position and in the region of the front edge of the seat part in a second translational position. The seat is further provided with two lateral sections. In the first translational position the two lateral sections are spaced apart from the front edge of the seat part by a shorter distance than the central section referred to the horizontal longitudinal direction. In the second translational position, the two lateral sections are spaced apart from the rear edge of the seat part by a shorter distance than the central section referred to the horizontal longitudinal direction. In the first and the second translational positions, the two lateral sections form a lateral support for a person on the seat and/or the seat part as a two-piece seat part including a first section and a second section and an intermediate space. A bracket extends through the intermediate space. The sliding mount preferably includes the bracket. A pivot mount serves to pivotably mounting the backrest part about a pivoting axis such that the front side of the backrest part serves as backrest surface in the first translational position and a first pivoting angle position of the backrest part and the front side of the backrest part also serves as backrest surface in the second translational position and a second pivoting angle position of the backrest part.

In another embodiment, the seat includes a mechanism for pivoting the two lateral sections relative to the central section, which is installed into the backrest part. In this configuration, the front side of the backrest part serves as backrest surface in the first translational position and the two lateral sections are in a first pivoting angle position relative to the central section and the rear side of the backrest part serves as backrest surface in the second translational position and the two lateral sections are in a second pivoting angle position relative to the central section.

In an embodiment, the pivoting axis is essentially aligned in the vertical direction. In this context, "essentially aligned in the vertical direction" is intended to mean that the pivoting axis is aligned with a deviation of less than about 30° from a vertical direction or Z-direction of the seat or motor vehicle, and preferably less than about 5°.

The first and second pivoting angle positions are preferably aligned relative to one another at a differential angle of essentially 180°. In this context, "essentially 180°" is intended to mean that the differential angle preferably lies in the range between 140° and 220°, and preferably between 160° and 200°. In the seat with the pivot mount, the differential angle of essentially 180° applies to the entire backrest part.

In a variation, the pivoting axis is essentially arranged centrally on the backrest part. In this context, "essentially arranged centrally" is intended to mean that the pivoting axis preferably is spaced apart from a vertically aligned center axis of the seat by a distance amounting to less than 30% of the width of the seat or the seat part, and preferably less than 5%.

Preferably, the first lateral section is pivotably mounted about a first lateral pivoting axis and the second lateral section is pivotably mounted about a second lateral pivoting axis. The first and second lateral pivoting axes are essentially aligned vertically. The first and/or second lateral section preferably forms a lateral subsection of the backrest part. The first and second pivoting axes are essentially aligned vertically, i.e. with a deviation of less than 30° from a vertical direction and/or a Z-direction of the seat or the motor vehicle.

In another embodiment, the transverse distance between the first and second lateral pivoting axes essentially corresponds to the width of the central section, particularly with a deviation of less than 30% and preferably less than 10%. In this case, the width of the central section is the dimension of the central section in the transverse direction or Y-direction of the seat or motor vehicle.

The rotating direction of the first lateral section for pivoting the first lateral section from the first pivoting angle position into the second pivoting angle position particularly extends opposite to the rotating direction of the second lateral section for pivoting the second lateral section from the first pivoting angle position into the second pivoting angle position.

In another embodiment, the seat part is realized in the form of a two-piece seat part including a first section and a second section and an intermediate space for leading through a bracket for the seat part is formed between the first and the second section such that the bracket can extend through the intermediate space. The sliding mount preferably includes the bracket. In this way, the sliding mount can be realized in a particularly simple fashion because a rail for the sliding mount is arranged underneath the seat part such that no separate device for the sliding mount is required laterally on the seat part and the seat therefore can be easily installed in the interior, particularly without requiring any additional space laterally outside the seat part.

In a variation, the intermediate space is realized in the form of a slot extending in the longitudinal direction, particularly a continuous through-slot in the longitudinal direction. In another variation, the sliding mount includes a rail and the bracket is movably mounted on the rail in the longitudinal direction by a bearing element.

In another embodiment, the sliding mount includes a stationary rack and a rotatably mounted gearwheel and the teeth of the gearwheel mesh with the teeth of the rack such that a translational motion of the backrest part causes a rotational motion of the gearwheel and the backrest part can be pivoted about the pivoting axis with the pivot mount by a torque transmitted from the gearwheel to the backrest part or the two lateral sections can be pivoted relative to the central section by the mechanism.

In another embodiment, the backrest part can be moved between the first and the second translational position with an actuator. The actuator preferably can pivot the backrest part about the pivoting axis or pivot the two lateral sections relative to the central section by the mechanism. In another embodiment, the actuator is an electric motor or a pneumatically or hydraulically operated drive.

In an embodiment, the pivot mount may include a locking mechanism for fixing the backrest part, particularly the entire backrest part, in the first or second pivoting angle position.

The mechanism may include a locking mechanism for fixing the two lateral sections in the first or second pivoting angle position. The sliding mount may also include a locking mechanism for locking the backrest part, particularly the entire backrest part, in the first or second translational position.

In another variation, the translational motion and/or the rail is essentially aligned in the longitudinal direction.

In a supplementary embodiment, the two lateral sections are in the first translational position spaced apart from the front edge of the seat part by a shorter distance than the central section referred to the horizontal longitudinal direction and the two lateral sections are in the second translational position spaced apart from the rear edge of the seat part by a shorter distance than the central section referred to the horizontal longitudinal direction. The distance of the two lateral sections preferably amounts to less than 98% of the distance of the central section and/or the distance of the central section, and preferably less than 80%. The two lateral sections from the front edge of the seat part in the horizontal longitudinal direction is defined relative to a fictitious vertical plane extending in the transverse direction on the front edge of the seat part and/or the distance of the central section and the two lateral sections from the rear edge of the seat part in the horizontal longitudinal direction is defined relative to a fictitious vertical plane extending in the transverse direction on the rear edge of the seat part.

In another variation, the respective width of a lateral section amounts to more than 3% of the overall width of the backrest part, and preferably more than 20%.

In another variation, the width of the central section amounts to more than 60% of the overall width of the backrest part, and preferably more than 90%.

In another variation, the seat, particularly the seat part and/or the backrest part, includes a support structure, preferably a frame. The support structure and/or the support leg are preferably made of metal, particularly steel and/or aluminum, and/or of plastic.

In another variation, the seat, particularly the seat part and/or the backrest part, includes padding, preferably in the form of a foam layer. The seat, particularly the seat part and/or the backrest part, may also include a seat cover, preferably of fabric or leather. The seating surface and/or the backrest surface is preferably formed by a seat cover, preferably of fabric or leather.

The X-direction is intended to mean a longitudinal direction of the seat or motor vehicle. The Y-direction is intended to mean a transverse direction of the seat or motor vehicle. The Z-direction is intended to mean a vertical direction of the seat or motor vehicle. The front side and the rear side of the backrest part are defined in the first translational position of the backrest part.

In another aspect, the present disclosure provides a motor vehicle including a vehicle body, at least one engine, particularly an internal combustion engine and/or an electric motor, and at least one seat. The seat is realized in the form of a seat described herein. The seat may take the form of a front seat or a rear seat of the motor vehicle.

BRIEF DESCRIPTION OF THE DRAWINGS

The present disclosure will hereinafter be described in conjunction with the following drawing figures, wherein like numerals denote like elements.

FIG. 3 shows a perspective view of the seat according to FIG. 1, wherein the backrest part is in the first translational position;

FIG. 4 shows a perspective view of the seat according to FIG. 2, wherein the backrest part is in the second translational position;

FIG. 5A shows a schematic top view of the seat according to FIGS. 1 and 2 with the backrest part in a first translational position;

FIG. 5B shows a schematic top view of the seat according to FIGS. 1 and 2 with the backrest part in an intermediate translational position;

FIG. 5C shows a schematic top views of the seat according to FIGS. 1 and 2 with the backrest part in a second translational position;

FIG. 6A shows a schematic side view of the seat according to FIGS. 1 and 2 with the backrest part in a first translational position;

FIG. 6B shows a schematic side view of the seat according to FIGS. 1 and 2 with the backrest part in an intermediate translational position;

FIG. 6C shows a schematic side view of the seat according to FIGS. 1 and 2 with the backrest part in a second translational position;

FIG. 7 shows a perspective view of a seat according to a second exemplary embodiment, wherein the backrest part is in the first translational position;

FIG. 8 shows a perspective view of the seat according to the second exemplary embodiment, wherein the backrest part is in the second translational position;

FIG. 9 shows a schematic top view of the seat according to FIGS. 7 and 8 with the seat part and with the backrest part in the first translational position, the intermediate translational position and the second translational position;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
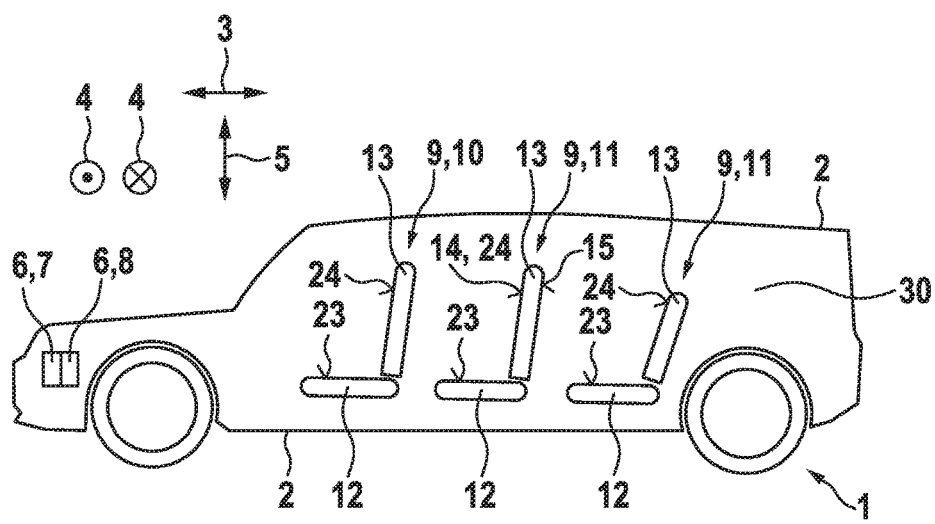
FIG. 1 shows a side view of a motor vehicle with a seat according to a first exemplary embodiment, wherein the backrest part of the seat is in a first translational position.
Figure 2:
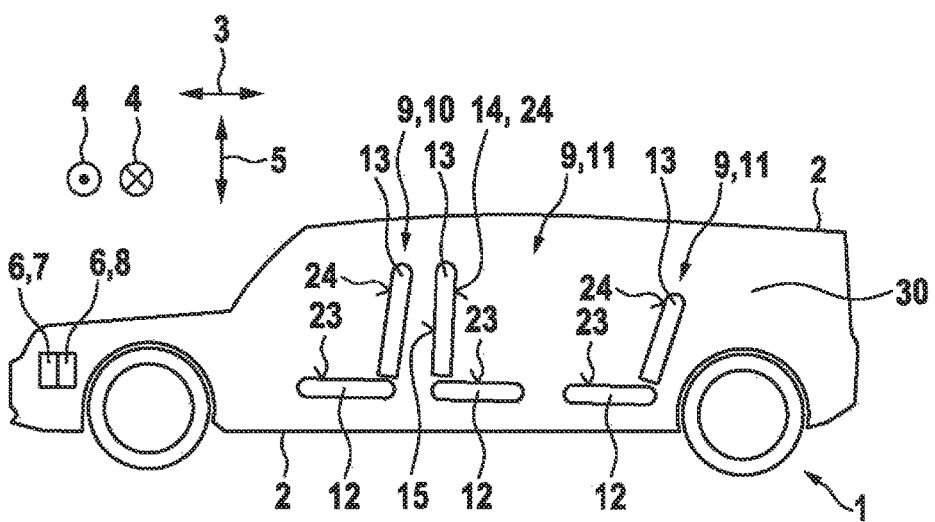
FIG. 2 shows a side view of the motor vehicle in FIG. 1 with the seat according to the first exemplary embodiment, wherein the backrest part of the seat is in a second translational position.
Figure 10:
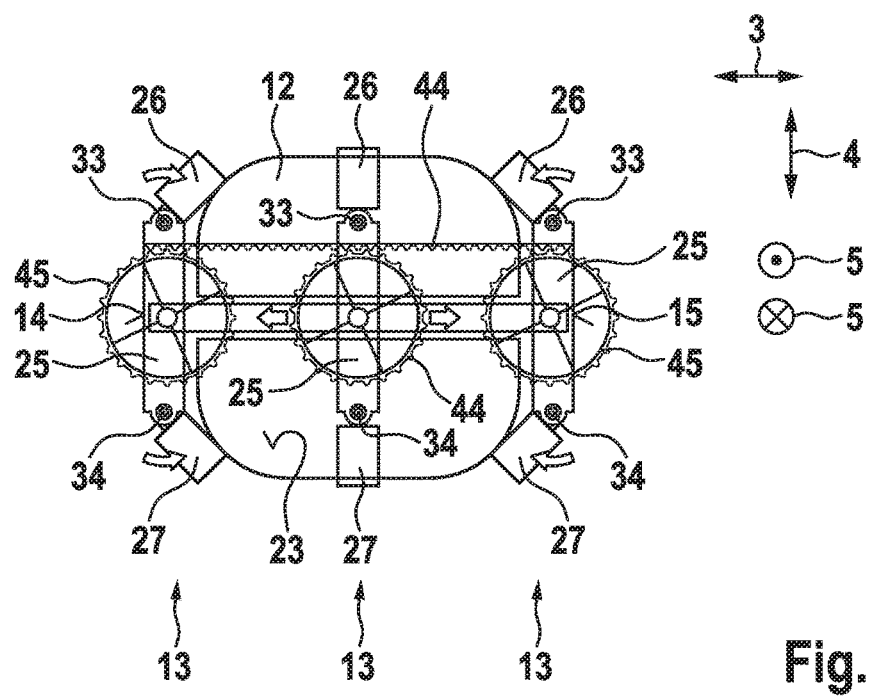
FIG. 10 shows a schematic top view of the seat according to FIGS. 7 and 8 with the seat part and with the backrest part in the first translational position, the intermediate translational position and the second translational position.
Figure 11:
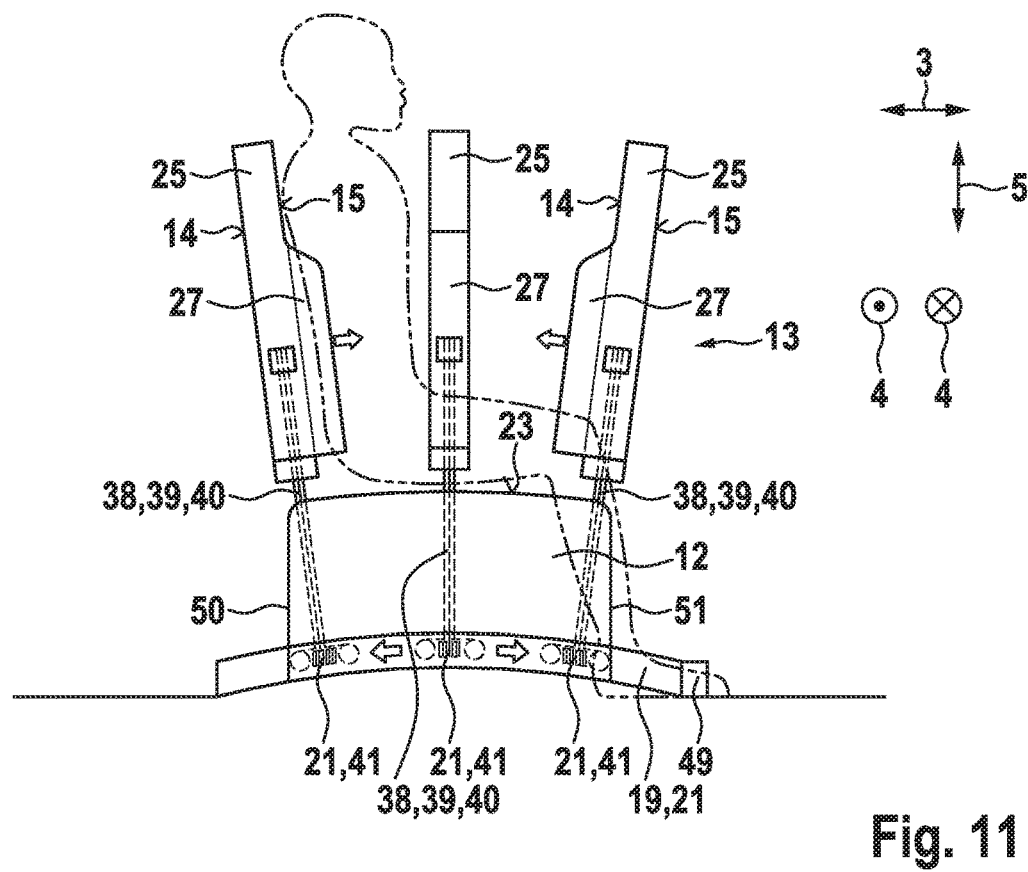
FIG. 11 shows a schematic side view of the seat according to FIGS. 7 and 8 with the seat part and with the backrest part in the first translational position, the intermediate translational position and the second translational position.
Figure 12:
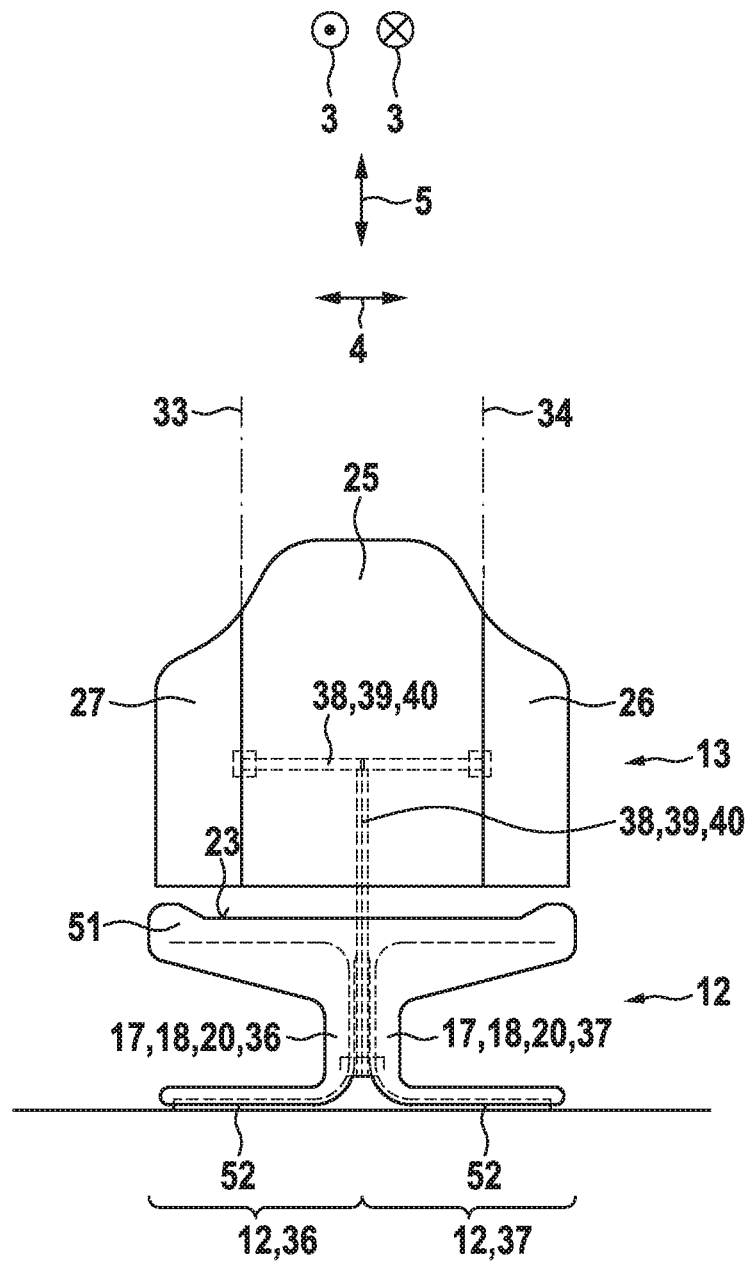
FIG. 12 shows another schematic rear view of the seat according to FIGS. 7 and 8 with the backrest part in the first translational position.

The motor vehicle 1 illustrated in FIGS. 1 and 2 is realized in the form of a hybrid or electric vehicle 1 and features a vehicle body 2 of metal, particularly steel. The motor vehicle 1 is propelled by a propulsion engine 6, for example an electric motor 7 and/or an internal combustion engine 8. An electric vehicle 1 merely features a propulsion engine 6 in the form of an electric motor 7 whereas a hybrid vehicle 1 features the electric motor 7 and the internal combustion engine 8. The vehicle body 2 of steel defines an interior and two seats 9 in the form of front seats 10, as well as three seats 9 in the form of rear seats 11, are arranged within the interior. The seats 9 include a seat part 12 and a backrest part 13. The seat part 12 of the seats 9 forms a seating surface 23 for supporting a buttocks and the backrest part 13 forms a backrest surface 24 for supporting a back. Three additional rear seats 11 are arranged behind these three rear seats 11 such that the motor vehicle 1 altogether includes three rows of seats 9 that are arranged behind one another. The motor vehicle 1 and the seat 9 have an X-direction or longitudinal direction 3 of the motor vehicle 1 and the seat 9, a Y-direction or transverse direction 4 of the motor vehicle 1 and the seat 9, and a Z-direction or vertically aligned direction 5 of the motor vehicle 1 and the seat 9. A cargo space 30 for accommodating cargo is arranged behind the rear seats 11 in the third row. The rear side of the cargo space 30 or trunk 30 is defined by a trunk lid and its front side is defined by the backrest parts 13 of the rear seats 11 in the third row.

FIGS. 1 to 6 show a first exemplary embodiment of the seat 9, wherein the backrest part 13 is respectively arranged in a first translational position in the region of a rear edge 51 of the seat part 12 and in a second translational position in the region of a front edge 50 of the seat part 12 by a sliding mount 21. The sliding mount 21 makes it possible to mount the backrest part 13 in such a way that the backrest part 13 can carry out a translational motion relative to the seat part 12 in the longitudinal direction 3 or the X-direction 3 of the motor vehicle 1. The seat part 12 and the backrest part 13 furthermore feature a support structure 17 in the form of a frame 18. Foam padding is respectively fastened on the support structure 17 of the seat part 12 and the backrest part 13 and a seat cover is arranged on the foam padding. The seat cover therefore defines the seating surface 23 and the backrest surface 24. Furthermore, support legs 20 are arranged on the seat part 12 and the seat 9 and therefore also the seat part 12 is mounted on the vehicle body 2 by the support legs 20. The seat part 12 is realized in the form of a two-piece seat part and includes a first section 36 and a second section 37. An intermediate space 42 in the form of a slot 43 is arranged between the first section 36 and the second section 37. In this case, the intermediate space 42 preferably exists only in the region of the support structure 17 or the frame 18 and the slot 43 is above the frame 18 closed with the elastic foam and the seat cover on the foam.

A rail 19 extending in the longitudinal direction 3 is fixed on the vehicle body 2 underneath the seat part 12 (FIGS. 5 and 6), wherein the rail 19 serves for mounting a bearing element 41. The bearing element 41 is therefore movably mounted on the rail 19 in the longitudinal direction 3, wherein the bearing element 41 features, for example, corresponding rollers for this purpose. A bracket 38 is fixed on the bearing element 41. The bracket 38 is realized in the form of a support rod 39 that is essentially aligned vertically in the Z-direction 5. The support structure 17 of the backrest part 13 is fixed on the support rod 39. In addition, a rack 44 is mounted on the vehicle body 2 parallel to the rail 19 and the teeth of a gearwheel 45 engage into the teeth of the rack 44. The gearwheel 45 is fixed on the support rod 39 in a rotationally rigid fashion such that the support rod 39 also forms a transmission shaft 40 for transmitting a torque from the gearwheel 45 to the backrest part 13. The transmission shaft 40 in the form of the support rod 39 is pivotably mounted in the bearing element 41 about a pivoting axis 31, which is essentially aligned vertically in the Z-direction 5, such that the entire backrest part 13 mounted on the respective support rod 38 or transmission shaft 40 can also be pivoted about the pivoting axis 31.

The backrest part 13 is illustrated in the first translational position in FIG. 3, as well as in the respective far right variations in FIGS. 5 and 6. In FIG. 4 and in the far left variations in FIGS. 5 and 6, the backrest part 13 is illustrated in the second translational position. In the central variation illustrated in FIGS. 5 and 6, the backrest part 13 is in an intermediate translational positioned between the first translational position and the second translational position. Since the teeth of the gearwheel 45 mesh with the teeth of the rack 44, the translational motion of the backrest part 13 between the first and the second translational position is kinematically coupled with a rotational or pivoting motion of the backrest part 13 about the pivoting axis 31. This means that either a corresponding horizontal pressure has to be exerted upon the backrest part 13 and/or a corresponding torque has to be applied to the backrest part 13 in order to move the backrest part 13 from the first translational position illustrated on the far right in FIGS. 5 and 6 into the second translational position illustrated on the far left in FIGS. 5 and 6. The backrest part 13 carries out a rotational motion about the pivoting axis 31 simultaneously with the translational motion of the backrest part 13 from the first translational position into the second translational position.

In the variation illustrated on the far right in FIGS. 5 and 6, in which the backrest part 13 is in the first translational position, a person can therefore sit down on the seat 9 such that the person is seated on the seat 9 in the motor vehicle 1 facing forward. In the second translational position illustrated in the form of the far left variation in FIGS. 5 and 6, a person can sit down on the seat 9 such that the person faces rearward, i.e. toward the cargo space 30. The backrest part 13 is illustrated in the first translational position in FIG. 1 whereas the backrest part 13 is illustrated in the second translational position in FIG. 2. The backrest part 13 has a front side 14 and a rear side 15. In this case, the front side 14 and the rear side 15 are defined by the first translational position and the front side 14 therefore also serves as the backrest surface 24 in the second translational position of the backrest part 13 because the backrest part 13 is at a first pivoting angle position in the first translational position and at a second pivoting angle position in the second translational position and a differential angle of approximately 180° is formed between the first and second pivoting angle positions.

The backrest part 13 is divided into a central section 25, as well as a first lateral section 26 and a second lateral section 27, in the transverse direction or Y-direction 4. The first and second lateral sections 26, 27 serve for laterally supporting a person on the seat 9, i.e. lateral forces resulting from lateral accelerations while the motor vehicle 1 negotiates curves can be absorbed by the first and second lateral sections 26, 27. For this purpose, the first and second lateral sections 26, 27 are in the first translational position of the backrest part 13 horizontally spaced apart from the front edge 50 of the seat part 2 by a shorter distance 53 than the central section 25 referred to the longitudinal direction 3 or X-direction 3. This applies inversely to the second translational position and the second pivoting angle position of the backrest part 13, i.e. the first and the second lateral sections 26, 27 are spaced apart from the rear edge 51 of the seat part 12 by a shorter distance 53 than the central section 25. In the first exemplary embodiment of the seat 9, the first and the second lateral sections 26, 27 are immovable relative to the central section 25, i.e. the backrest part 13 forms a unit that is not movable in itself. The width 35 of the central section 25 amounts to approximately 70% of the overall width of the backrest surface 24 and the width 28 of each lateral section 26, 27 respectively amounts to 15% of this overall width.

The bracket 38 is guided through the intermediate space 42 between the first section 36 and the second section 37 of the seat part 12 during the motion of the backrest part 13 from the first translational position into the second translational position. The slot 43 or the intermediate space 42 is merely formed on the support structure 17 of the seat part 12, but not in the region of the padding. An elastic deformation and recovery takes place in the region of the foam padding during the motion of the bracket 38 through the intermediate space 42 such that the bracket 38 can also be moved between the two sections 36, 37 of the seat part 12 in the X-direction 3 of the motor vehicle 1 in the region of the padding. Consequently, the seating surface 23 does not contain an opening, but rather merely a shallow oblong gap above the intermediate space 42 on the support structure 17 of the seat part 12. The seating surface 12 is therefore very comfortable and essentially unaffected by the intermediate space 42.

The forces required for moving the backrest part 13 may either be manually exerted upon the backrest part 13 or corresponding forces are directly or indirectly applied to the backrest part 13 by an actuator 49, for example an electric motor. The seat 9 is furthermore realized with a locking mechanism, by which the backrest part 13 can be fixed in the first translational position and the first pivoting angle position and in the second translational position and the second pivoting angle position such that a person can sit down on the seat 9.

FIGS. 7 to 12 show a second exemplary embodiment of the seat 9, which is similar to the first exemplary embodiment according to FIGS. 3 to 6 described above. As such only those differences between this second exemplary embodiment and the first exemplary embodiment are described below. A mechanism for pivoting the first and the second lateral section 26, 27 relative to the central section 25 is installed into the backrest part 13. In this case, the first lateral section 26 can be pivoted relative to the central section 25 about a first lateral pivoting axis 33, which is essentially aligned vertically in the Z-direction 5. Analogously, the second lateral section 27 is pivotably mounted relative to the central section 25 about a second lateral pivoting axis 34 extending in the vertical direction or Z-direction 5. The bracket 38 in the form of the support rod 39 consists of a two-piece bracket, i.e. the transmission shaft 40 is installed as an additional component within the bracket 38. The outer bracket 38 is rigidly connected to the bearing element 41 and the transmission shaft 40 is rotatably mounted on the bearing element 41. The transmission shaft 40 is connected to the gearwheel 45 in a rotationally rigid fashion and the gearwheel 45 meshes with the teeth of the rack 44 (FIG. 9).

Two connecting arms 46 are mounted on the transmission shaft 40 and the connecting arms 46 are respectively connected to the first lateral section 26 and to the second lateral section 27 with a partial shaft 47. A partial support structure 48 is respectively connected to each partial shaft 47. The transmission shaft 40 carries out a rotational motion about an axis extending in the direction of the longitudinal axis of the transmission shaft 40, wherein the transmission shaft 40, which is essentially invisible from outside because it is arranged within the bracket 38, thereby causes the first lateral section 26 and the second lateral section 27 to respectively pivot in opposite directions. The backrest part 13 is arranged in the first translational position relative to the seat part 12 in the variation illustrated on the far right in FIGS. 9 to 11 and in the second translational position in the variation illustrated on the far left in FIGS. 9 to 11.

During the motion of the backrest part 13 from the first translational position into the second translational position, the central section 25 therefore only carries out a translational motion whereas the two lateral sections 26 respectively carry out oppositely directed rotational motions about the first and second lateral pivoting axes 33, 34. In the first translational position of the backrest part 13, the front side 14 of the backrest part 13 therefore serves as backrest surface 24 whereas the rear side 15 serves as backrest surface 24 in the second translational position of the backrest part 13. The first and the second lateral section 26, 27 are respectively spaced apart from the opposing end 50, 51 of the seat part 12 by a correspondingly shorter distance 53 than the central section 25 in the first and the second translational position of the backrest part 13 such that the backrest part 13 provides lateral support for persons on the seat 9 in the first translational position, as well as in the second translational position. Since the teeth of the gearwheel 45 mesh with the teeth of the rack 44, the translational motion of the backrest part 13 from the first translational position into the second translational position and vice versa is kinematically coupled with a rotational motion of the transmission shaft 40 such that the two lateral sections 26, 27 respectively carry out corresponding rotational and pivoting motions about the first and second lateral pivoting axes 33, 34 due to the mechanical and kinematic coupling of the transmission shaft 40 with the two partial shafts 47. In order to move the backrest part 13 from the first into the second translational position and to move the two lateral sections 26, 27 from the first pivoting angle position into the second pivoting angle position relative to the central section, it is respectively required to exert a corresponding horizontally directed force upon the backrest part 13 in the X-direction 3 or to apply a torque to one or both lateral sections 26, 27. The required forces may also be directly or indirectly exerted upon the backrest part 13 by an actuator 49.

As a supplement, the entire seat 9 is movably mounted in the X-direction 3 of the motor vehicle by a master rail 52 (FIG. 12) such that the entire seat 9, namely the seat part 12, as well as the backrest part 13 and the sliding mount 21, i.e. particularly the rail 19, participates in this translational motion.

All in all, the seat 9 and the associated motor vehicle 1 provide significant advantages. Since the backrest part 13 can be arranged in the first and the second translational position, persons can sit down on the seat 9 facing in both directions. In this case, the backrest surface 24 of the backrest part 13 is on the two lateral sections 26, 27 spaced apart from the respective opposing end 50, 51 of the seat part 12 by a shorter distance 53 than the central section 25 referred to the X-direction 3 such that the seat 9 can advantageously provide lateral support for persons on the seat 9 in both translational positions of the backrest part 13. This is realized with a means 22 that is realized in the form of the pivot mount 16 in the first exemplary embodiment and in the form of the mechanism 32 in the second exemplary embodiment. The seat 9 may be realized in the form of a front seat 10 or a rear seat 11. If the seat is realized in the form of a front seat, particularly for the front passenger, a child safety seat can be fixed on the seat 9 in a particularly simple and secure fashion while the backrest part 13 is in the second translational position because the backrest part 13 forms a stop or limit stop for the child safety seat during an accident.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A seat for a motor vehicle comprising:
    a backrest part having a front side, a back side facing away from the front side, and a backrest surface configured to support a back of a seated occupant, wherein the backrest surface is transversely divided into a central section and two lateral sections;
    a seat part having a seating surface configured to support a buttock of the seated occupant;
    a sliding mount for the backrest part and configured to realize a translational motion of the backrest part relative to the seat part such that the backrest part is positioned in the region of a rear edge of the seat part in a first translational position and in the region of a front edge of the seat part in a second translational position; and
    a support provided on the seat having two lateral sections forming a lateral support for the seated occupant;
    wherein the two lateral sections, when in the first translational position, are spaced apart from the front edge of the seat part by a shorter distance than the central section in a horizontal longitudinal direction;
    wherein the two lateral sections, when in the second translational position, are spaced apart from the rear edge of the seat part by a shorter distance than the central section in the horizontal longitudinal direction; and
    wherein the sliding mount comprises a stationary rack and a rotatably mounted gearwheel having teeth which mesh with teeth on the rack such that a translational motion of the backrest part causes a rotational motion of the gearwheel such that the backrest part is pivotable about the pivoting axis with the pivot mount by a torque transmitted from the gearwheel to the backrest part.

2. The seat according to claim 1, wherein the support comprises a pivot mount configured to pivotably mount the backrest part about a pivoting axis such that the front side of the backrest part serves as backrest surface in the first translational position and a first pivoting angle position of the backrest part and the front side of the backrest part also serves as backrest surface in the second translational position and a second pivoting angle position of the backrest part.

3. The seat according to claim 2, wherein the pivoting axis is essentially aligned in the vertical direction.

4. The seat according to claim 3, wherein the pivoting axis is essentially arranged centrally on the backrest part.

5. The seat according to claim 1, wherein the support comprises a mechanism configured to pivot the two lateral sections relative to the central section and installed into the backrest part such that the front side of the backrest part serves as backrest surface in the first translational position and the two lateral sections are in a first pivoting angle position relative to the central section and the rear side of the backrest part serves as backrest surface in the second translational position and the two lateral sections are in a second pivoting angle position relative to the central section.

6. The seat according to claim 5, wherein the first and second pivoting angle positions are aligned relative to one another at a differential angle of essentially 180°.

7. The seat according to claim 5, wherein the first lateral section is pivotably mounted about a first lateral pivoting axis and the second lateral section is pivotably mounted about a second lateral pivoting axis, wherein the first and second lateral pivoting axes are essentially aligned vertically.

8. The seat according to claim 7, wherein the distance between the first and second lateral pivoting axes in the transverse direction essentially corresponds to the width of the central section.

9. The seat according to claim 8, wherein the rotating direction of the first lateral section for pivoting the first lateral section from the first pivoting angle position into the second pivoting angle position extends opposite to the rotating direction of the second lateral section for pivoting the second lateral section from the first pivoting angle position into the second pivoting angle position.

10. The seat according to claim 5 wherein the translational motion of the backrest part causes the rotational motion of the gearwheel such that the two lateral sections are pivotable relative to the central section by the mechanism.

11. The seat according to claim 10, further comprising an actuator configured to move the backrest part between the first and the second translational positions.

12. The seat according to claim 11, wherein the actuator is configured to pivot the backrest part about a pivoting axis.

13. The seat according to claim 11, wherein the actuator is configured to pivot the two lateral sections relative to the central section by the mechanism.

14. A seat for a motor vehicle comprising:
a backrest part having a front side, a back side facing away from the front side, and a backrest surface configured to support a back of a seated occupant, wherein the backrest surface is transversely divided into a central section and two lateral sections;
a seat part having a seating surface configured to support a buttock of the seated occupant;
a sliding mount for the backrest part and configured to realize a translational motion of the backrest part relative to the seat part such that the backrest part is positioned in the region of a rear edge of the seat part in a first translational position and in the region of a front edge of the seat part in a second translational position; and
a support provided on the seat having two lateral sections forming a lateral support for the seated occupant;
wherein the two lateral sections, when in the first translational position, are spaced apart from the front edge of the seat part by a shorter distance than the central section in a horizontal longitudinal direction; and
wherein the two lateral sections, when in the second translational position, are spaced apart from the rear edge of the seat part by a shorter distance than the central section in the horizontal longitudinal direction, the seat part comprises a two-piece seat part having a first section, a second section and an intermediate space between the first and second sections having a bracket extending therethrough, and the sliding mount comprises the bracket.

15. The seat according to claim 14, wherein the intermediate space comprises a slot extending in the longitudinal direction.

16. The seat according to claim 14, wherein the sliding mount comprises a rail and the bracket is movably mounted on the rail in the longitudinal direction by a bearing element.

17. A motor vehicle, comprising:
a vehicle body;
at least one propulsion engine; and
at least one seat including:
a backrest part having a front side, a back side facing away from the front side, and a backrest surface configured to support a back of a seated occupant, wherein the backrest surface is transversely divided into a central section and two lateral sections;
a seat part having a seating surface configured to support a buttock of the seated occupant;
a sliding mount for the backrest part and configured to realize a translational motion of the backrest part relative to the seat part such that the backrest part is positioned in the region of a rear edge of the seat part in a first translational position and in the region of a front edge of the seat part in a second translational position; and
a support provided on the seat having two lateral sections forming a lateral support for the seated occupant;
wherein the two lateral sections, when in the first translational position, are spaced apart from the front edge of the seat part by a shorter distance than the central section in a horizontal longitudinal direction;
wherein the two lateral sections, when in the second translational position, are spaced apart from the rear edge of the seat part by a shorter distance than the central section in the horizontal longitudinal direction; and
wherein the sliding mount comprises a stationary rack and a rotatably mounted gearwheel having teeth which mesh with teeth on the rack such that a translational motion of the backrest part causes a rotational motion of the gearwheel such that the backrest part is pivotable about the pivoting axis with the pivot mount by a torque transmitted from the gearwheel to the backrest part.

* * * * *